United States Patent [19]

Weemes et al.

[11] 4,105,718
[45] Aug. 8, 1978

[54] PEROXIDE TREATED SUBSTANTIALLY AMORPHOUS POLYOLEFIN/HYDROCARBON RUBBER BLENDS USEFUL AS PRESSURE-SENSITIVE ADHESIVES

[75] Inventors: Doyle A. Weemes, Greeneville; Richard L. McConnell, Kingsport, both of Tenn.

[73] Assignee: Eastman Kodak Company, Rochester, N.Y.

[21] Appl. No.: 813,376

[22] Filed: Jul. 6, 1977

[51] Int. Cl.² .................................................. C08F 8/06
[52] U.S. Cl. ............................. 260/889; 260/897 A; 526/57
[58] Field of Search .............. 526/57; 260/889, 897 A

[56] References Cited

U.S. PATENT DOCUMENTS

| | | | |
|---|---|---|---|
| 3,449,191 | 6/1969 | Taylor | 526/57 |
| 3,584,080 | 6/1971 | Walker et al. | 260/889 |

*Primary Examiner*—William F. Hamrock
*Attorney, Agent, or Firm*—Clyde L. Tootle; Daniel B. Reece, III

[57] ABSTRACT

The invention relates to a process for the treatment of substantially amorphous polyolefin/hydrocarbon rubber blends with peroxides at high temperatures to provide permanently tacky, low viscosity materials which have useful pressure-sensitive adhesive properties. These permanently tacky blends are obtained, for example, by treating a blend of substantially amorphous polyolefins, such as amorphous polypropylene or amorphous propylene/1-butene copolymers, and a hydrocarbon rubber, with peroxides at high temperatures.

12 Claims, No Drawings

PEROXIDE TREATED SUBSTANTIALLY AMORPHOUS POLYOLEFIN/HYDROCARBON RUBBER BLENDS USEFUL AS PRESSURE-SENSITIVE ADHESIVES

This invention relates to peroxide treated substantially amorphous polyolefin/hydrocarbon rubber blend compositions having a novel combination of properties. More specifically, the invention relates to peroxide treated substantially amorphous polyolefin/hydrocarbon rubber blends which provide pressure-sensitive adhesive compositions having permanent tackiness.

Pressure-sensitive adhesive (PSA) products have experienced a rapid growth rate in recent years because of their ease of application. Typical pressure-sensitive adhesive applications include, for example, tapes (consumer, industrial, and surgical), labels, decals, films, floor tile and wall and shelf coverings. Until recently, virtually all pressure-sensitive compositions were based on blends of high molecular weight synthetic and natural rubbers with tackifiers. Frequently fillers such as zinc oxide or magnesium oxide are used in PSA formulations which are applied to opaque backing substrates. Typical backing materials include paper, cellophane, plasticized poly(vinyl chloride), polyester film, cellulose acetate film, cloth, foamed polymers (e.g., foamed polystyrene or polypropylene), metal foils, felt, cork and the like. Although PSA compositions have generally been applied to the backings from solvents, there is a need for PSA materials which can be applied as hot melts to eliminate solvent pollution during manufacturing of the products. Also, a non-solvent adhesive is desirable since many solvents are in short supply.

In polymerization processes for polymerizing propylene using a wide variety of catalysts, some product is formed which is hexane soluble which has been defined as amorphous polypropylene. This material, however, may contain some fractions which are crystalline. This amorphous polypropylene, when solidified from the melt, is initially tacky and has some pressure-sensitive tack. However, on standing it loses this surface tackiness, due to crystallization of the crystallizable fraction. These materials for the purpose of this invention are defined as substantially amorphous polyolefins.

Substantially amorphous polypropylene provides a good hot melt adhesive when used alone or blended with other materials. These substantially amorphous polyolefins are also useful in the lamination of paper-to-paper, paper to foil and the like when used as a hot melt adhesive. These substantially amorphous polyolefins, even when blended with rubbers, however, are not useful as pressure-sensitive adhesives as they lose their tackiness after solidification. For example, substantially amorphous polypropylene begins to lose its surface tack within 6 minutes after solidifying from the melt due to crystallization of a polymer fraction. After about 3 hours the substantially amorphous polypropylene has become virtually nontacky. Therefore, it would be an advance in the state of the art to provide a permanently tacky substantially amorphous polyolefin which can be used as a pressure-sensitive adhesive.

Accordingly, it is one of the objects of this invention to provide a novel pressure-sensitive adhesive.

Another and further object of this invention is to provide a pressure-sensitive adhesive having good adhesive properties which can be applied without the use of a solvent.

A still further object of the invention is to provide an adhesive prepared from a substantially amorphous polyolefin/hydrocarbon rubber composition which is tacky at ambient temperatures.

Another and still further object of this invention is a process for preparing the permanently tacky amorphous polyolefin/hydrocarbon rubber compositions useful as pressure sensitive adhesives.

A still further object of the invention is the use of these permanently tacky amorphous polyolefin/hydrocarbon rubber blends as pressure-sensitive adhesives.

In accordance with the present invention we have found that a substantially amorphous polyolefin, such as amorphous polypropylene, blended with up to 50 percent hydrocarbon rubber, provides a blend which can be treated with peroxides at 150° C. to 250° C. to provide a low viscosity, permanently tacky, hot-melt pressure-sensitive adhesive composition. This peroxide treatment renders the substantially amorphous polyolefin/rubber blend permanently tacky.

Substantially amorphous polyolefins useful in the practice of this invention include substantially amorphous homopolymers of 1-olefins containing 3 to 5 carbon atoms, substantially amorphous copolymers prepared from ethylene and 1-olefins containing 3 to 5 carbon atoms, substantially amorphous propylene/1-butene copolymers, and substantially amorphous propylene or 1-butene/higher 1-olefin copolymers containing less than 40 mole percent of at least one higher 1-olefin of the group consisting of 1-hexene, 1-heptene, 1-octene, 1-nonene, and 1-decene. In defining these polymeric compositions it should be noted again that the term amorphous as used herein defines a polymeric composition that may contain some crystallizable fraction. For example, the hexane soluble portion of polypropylene contains in addition to the completely amorphous portion some low molecular weight crystallizable material. Also, the amorphous propylene/1-butene copolymers or the amorphous propylene or 1-butene/higher 1-olefin copolymers containing less than about 40 mole percent higher 1-olefin may contain some crystallizable fractions. Also, these substantially amorphous polyolefins can be used as a blend with crystalline polyolefins or blends of such substantially amorphous polyolefins. The crystallizable polymer component of these blends, however, should not exceed a concentration of about 20%. The melt viscosity of the substantially amorphous polyolefin materials is generally in the range of about 100 to 200,000 cp at 190° as measured by ASTM D1238.

Rubbery hydrocarbon polymers useful in this invention include ethylene/propylene copolymer rubbers, ethylene/propylene/diene terpolymers or blends of such hydrocarbon rubbers. Although the high molecular weight hydrocarbon rubbers used in rubber compounding are useful in this invention, they are sometimes difficult to blend with the amorphous polyolefin materials and lower molecular weight hydrocarbon rubbers are preferred. For example, hydrocarbon rubbers with melt viscosity as low as about 3,000 cp. are highly suitable. High molecular weight hydrocarbon rubbers with melt flow rates of about 0.1 (measured at 230° C. in melt indexer using 2.16 kg. weight according to ASTM D1238) are also useful. When using the high molecular weight hydrocarbon rubbers, it is possible to make master batches of hydrocarbon rubber and amorphous polyolefin which are then blended with additional amorphous polyolefin or the hydrocarbon rubber and amorphous polyolefin may be intimately mixed by dissolving the two materials in a common solvent such as benzene, toluene, xylene, carbon tetrachloride, perchloroethylene, and the like. Concentrations of hydrocarbon rubber of about 1 to about 50% are operable, but we prefer to operate with concentrations of about 2 to about 25% by weight.

The melt viscosity of the products obtained is, of course, dependent on the melt viscosity of the initial polymer and hydrocarbon rubber components. Preferred peroxide treated blends have melt viscosities of about 10,000 to about 250,000 cp. at 190° C. Samples with melt viscosity greater than about 250,000 have long open times after solidification from the melt, but they generally are not permanently tacky. For these high viscosity materials, it is generally necessary to add tackifying resins such as hydrocarbon tackifying resins as EASTMAN Resin H, polyterpenes, wood rosin esters, terpene-phenol resins, and the like or plasticizers to lower the blend melt viscosity to a useful range and to improve the degree of tack in the material.

The peroxide concentration can range from about 2 to about 25 weight percent, based on the amorphous polymer, with a preferred peroxide concentration range of about 3 to 20 weight percent. The peroxide treatments are generally conducted in the range of about 150° to 250° C., preferably 175° to 225° C. The reaction time may vary from a few minutes to several hours depending on the temperature used and the half life of the peroxide being used. For example, in using (Lupersol 101) 2,5-dimethyl-2,5-di(tertiarybutyl peroxy) hexane, reaction temperatures of about 190° to about 210° C. are highly suitable. At a temperature of 190° C., the 2,5-dimethyl-2,5-di(tertiarybutyl peroxy) hexane has a half life of about 0.24 minutes.

One substantially amorphous polyolefin useful in this invention is the essentially noncrystalline hexane soluble amorphous polypropylene, formed in minor amounts during the production of crystalline polypropylene by the polymerization of propylene in the presence of stereospecific catalysts by a process as disclosed in U.S. Pat. No. 3,679,775, incorporated herein by reference. The solid, substantially amorphous polypropylene has a viscosity of about 1,000 to about 50,000 centipoise at 190° C. (ASTM D-1238), and preferably from about 1,500 to about 15,000 centipoise. The substantially amorphous polyolefin can be blended with crystalline polyolefin in an amount of up to about 20 percent by weight. One such commercially available amorphous polyolefin useful in preparing the pressure-sensitive adhesives is the Eastobond M-5 polyolefin available from Eastman Chemical Products, Inc. These substantially amorphous polymers can also be produced directly, i.e., without production of substantial amounts of crystalline copolymer by polymerizing a mixture of propylene and butene-1 in mineral spirits at a temperature of about 100° C. to about 180° C. and a pressure in the range of about atmospheric to about 2,000 psig. with the catalyst containing an organopolylithium aluminum compound and the HA or AA forms of titanium trichloride in a mole ratio of 0.01–0.05/0.1–1.0/1 by a polymerization process as disclosed in U.S. Pat. No. 3,679,775, which disclosure is incorporated herein by reference. Methods of preparation of the organopolylithium aluminum compounds are also disclosed in U.S. Pat. No. 3,679,755. These amorphous propylene-1-butene copolymers generally contain from about 30 percent to about 75 weight percent of butene-1, and having a melt viscosity of about 100 to 100,000 centipoise at 190° C., a solubility in refluxing hexane of at least 99 weight percent, a solubility in refluxing diethyl ether of at least 60 weight percent, a ring and ball softening point in the range of about 78° to 120° C., and a differential scanning calorimeter melting point not greater than 120° C. The substantially amorphous polyolefin could be degraded to the desired melt viscosity if one starts with a high molecular weight substantially amorphous polymer.

The substantially amorphous polyolefin component can also be a substantially amorphous, hexane soluble propylene-alpha-monoolefin copolymer. These substantially amorphous copolymers are formed in varying amounts during the production of crystalline propylene-alpha-monoolefin copolymers by stereospecific polymerization of propylene and a different alpha-monoolefin by a process as disclosed in U.S. Pat. No. 3,529,037, incorporated herein by reference. These substantially amorphous copolymers can also contain various amounts of hexane insoluble polymer up to an amount of about 20 weight percent.

The poly(propylene-co-higher 1-olefin) useful in the present invention is a substantially amorphous propylene/higher 1-olefin copolymer containing less than about 40 mole percent higher 1-olefin which is partially crystalline and has a melt viscosity range at 190° C. of 10,000 to 200,000 cp., a density of greater than 0.86 and a glass transition temperature (Tg) of about −15° to about −25° C. wherein said higher 1-olefin is a member of the group consisting of 1-hexene, 1-heptene, 1-octene, 1-nonene and 1-decene. The 1-butene/higher 1-olefin copolymers containing less than 40 mole percent higher 1-olefin are also useful in the practice of this invention. Such poly(propylene-co-higher 1-olefin) copolymers can be made according to the procedure in U.S. Pat. No. 3,954,697 by varying the amount of monomer in the polymerization reaction.

Peroxides useful in the present invention include, for example, ditertiarybutyl peroxide, 2,5-dimethyl-2,5-di(-tertiarybutylperoxy) hexane (Lupersol 101), dicumyl peroxide, and cumene hydroperoxide. In general, the alkyl peroxides such as ditertiarybutyl peroxide and the Lupersol 101 type materials are preferred in order to provide polymers having a high degree of tack.

Suitable reaction vessels include those made from glass or metal. For example, the reactions may be conducted in glass flasks, glass lined reactors, steel autoclaves, Brabender plastographs, Banbury mixers, and the like. The reactions may be conducted in the presence of air or under inert gases such as nitrogen. Although not required, it is also possible to carry out the peroxide treatment in the presence of an inert solvent such as benzene. The pressure-sensitive adhesives of this invention may be stabilized by the addition of conventional stabilizers for polyolefin materials such as dilauryl thiodipropionate, Plastanox 1212 (lauryl stearyl thiodipropionate), Irganox 1010 {pentaerythritol tetrakis[3,(3,5-di-tert-butyl-4-hydroxyphenyl)propionate]}, Eastman Inhibitor DOPC (dioctadecyl p-cresol), Plastanox 2246 [2,2'-methylene bis(4-methyl-6-tert-butylphenol)], and Ethyl 702 [4,4'-methylene bis(2,6-di-tert-butylphenol)], or combinations of such stabilizers. Effective stabilizer concentrations may range from about 0.1 to about 0.5% by weight. For example, 0.25% Irganox 1010 or a combination of 0.25% Irganox 1010 with 0.25% Plastanox 1212 provides good melt viscosity and color stability when the adhesive is maintained in molten form at 350° F. for 8 hours or longer.

The adhesives of the invention may be used alone or in mixture with other materials such as polyethylene waxes, polypropylene waxes, amorphous polypropylene, amorphous block ethylene/propylene copolymer, paraffin, polyterpenes such as those commercially available and sold as "Nirez 1100", "Nirez 1135", "Piccolyte S10", "Piccolyte 40", "Piccolyte 100", or "Piccolyte 135"; hydrocarbon resins such as "Piccopale 85", "Piccopale 100", "Staybelite" or DAC-B hydrocarbon resin, and the like.

Small amounts of pigments, colorants, and other additives may be added to the peroxide-treated polyolefins as desired.

This invention can be further illustrated by the following examples although it will be understood that these examples are included merely for purposes of illustration and are not intended to limit the scope of the invention.

EXAMPLE 1

Enjay EPT 3509 rubber (ethylene/propylene/diene terpolymer; I.V. 2.1) is placed in a large test tube and vacuum stripped to remove the air. It is then placed into a 400° C. sand bath under a nitrogen atmosphere for 25 minutes to thermally degrade the polymer. The degraded EPT has a melt viscosity of 17,000 cp. at 190° C. Low viscosity amorphous polypropylene (42.75 g.; Eastobond M-5W, melt viscosity 2500 cp. measured in melt indexer at 190° C.) and thermally degraded Enjay EPT 3509 rubber [2.25 g. (5 wt. %); melt viscosity 17,000 cp. at 190° C.] are melted in a Brabender Plastograph at 200° C. A solution of 9.0 g. (20 wt. %) Lupersol 101 in 15 ml. of heptane is added to the molten polymers over a 10–12 minute period and the heptane is allowed to flash off. After about 30 minutes processing time in the Brabender Plastograph, the peroxide treated blend has a melt viscosity of 190,000 cp. at 190° C. The product is permanently tacky and rubbery.

The sample is placed between Mylar film and a stainless steel plate and placed into a heated (140° C.) Wabash hydraulic press using two tons of pressure. The sample is removed from the press and allowed to cool to room temperature. The coated tape (polymer thickness about 1 mil) performs well as a pressure-sensitive tape material. For example, when the tape is pulled away from the stainless steel surface, no polymer residue is left on the steel, demonstrating that the polymer has good cohesive strength. The product may also be coated on Mylar tape from a solvent such as toluene or xylene. For example, a 10 wt. % solution of the product in xylene forms a clear, colorless dope when cooled back to 23° C.

EXAMPLE 2

A master batch of Eastobond M-5W containing 50 wt. % Enjay EPT 3509 (I.V. 2.1) is made in a Brabender Plastograph for 30 minutes at 180° C. Low viscosity amorphous polypropylene (40.5 g.; Eastobond M-5W, melt viscosity 2500 cp. at 190° C.) and 4.5 g. of the above-described 50/50 Eastobond M-5W/Enjay EPT 3509 master batch are melted in a Brabender Plastograph at 200° C. to provide a blend which contains 5 wt. % EPT rubber. A solution of 9.0 g. (20 wt. %) of Lupersol 101 in 10 ml. of heptane is added to the molten polymers over a 10-minute period and the heptane is allowed to flash off. After about 30 minutes processing time in the Brabender Plastograph, the peroxide treated blend has a melt viscosity of 72,000 cp. at 190° C. and the product is permanently tacky. The product is coated on Mylar film from the melt by using a heated doctor blade (177° C.) to give a polymer thickness of about 1 mil. The product performs well as a pressure-sensitive tape material. For example, when the coated tape is bonded to a clean stainless steel surface, it peels away without leaving a residue, demonstrating that the polymer has good cohesive strength.

EXAMPLE 3

Low viscosity amorphous polypropylene (42.75 g.; Eastobond M-5W, melt viscosity 2500 cp. at 190° C.) and ethylene/propylene/diene terpolymer [2.25 g. (5 wt. %); Enjay EPT 3509 rubber, I.V. 2.1] are melted in a Brabender Plastograph at 200° C. A solution of 9.0 g. (20 wt. %) of Lupersol 101 in 10 ml. of heptane is added to the molten polymer over a 10-minute period and the heptane is allowed to flash off. After about 30 minutes processing time in the Brabender Plastograph, the blend is permanently tacky. The melt viscosity of this peroxide treated blend is substantially higher than that of the starting blend but a specific melt viscosity on the final product could not be obtained in a melt indexer due to the presence of poorly dispersed particles of EPT rubber.

EXAMPLE 4

Low viscosity amorphous poly-1-butene (42.75 g.; melt viscosity 2500 cp. at 190° C.) and 2.25 g. (5 wt. %) of thermally degraded Enjay EPT 3509 rubber (melt viscosity 17,000 cp. at 190° C.) are melted in the Brabender Plastograph at 200° C. A solution of 9 g. (20 wt. %) of Lupersol 101 in 10 ml. of heptane is added over a 10-minute period and the heptane is allowed to flash off. After about 30 minutes of processing time, the peroxide treated blend has a melt viscosity of 160,000 cp. at 190° C. The product is permanently tacky and it has pressure-sensitive properties similar to the product described in Example 1. For example, the polymer is heated to 177° C. and coated onto poly(ethylene terephthalate) film by means of a heated doctor blade to give a uniform 1 mil coating. The coated tape performs well as a pressure-sensitive tape material. For example, the polymer coating remains permanently tacky and it has good adhesion to paper, steel, polyethylene, and the like. When a torn page is mended with this tape, the printed matter under the tape is quite legible. Also this product may be used as a temporary adhesive for bonding polyethylene or latex backed carpeting to metal, such as in the bonding of carpeting to the floor panel of automobiles.

EXAMPLE 5

Low viscosity amorphous poly(50-propylene-co-50-1-butene) (42.75 g.; melt viscosity 30,000 cp. at 190° C.) and 2.25 g. (5 wt. %) of thermally degraded Enjay EPT 3509 rubber (melt viscosity 17,000 cp. at 190° C. as described in Example 1) are melted in the Brabender Plastograph at 200° C. A solution of 9 g. (20 wt. %) of Lupersol 101 in 10 ml. of heptane is added over a 10-minute period and the heptane is allowed to flash off. After about 30 minutes of processing time, the peroxide treated blend has a melt viscosity of 220,000 cp. at 190° C. and it is permanently tacky. Its properties are similar to those of the material described in Example 4.

EXAMPLE 6

Low viscosity amorphous polypropylene (42.75 g.; melt viscosity 2500 cp. at 190° C.) and ethylene/propylene/diene terpolymer [2.25 g. (5 wt. %); Enjay EPT 3509 rubber; I.V. 2.1] are dissolved in carbon tetrachloride to disperse the terpolymer rubber into the amorphous polypropylene and the solvent is removed by vacuum stripping. This homogeneous blend is melted in the Brabender Plastograph at 200° C. A solution of 9 g. (20 wt. %) of Lupersol 101 in 10 ml. of heptane is added to the molten polymers over a 10-minute period and the heptane is allowed to flash off. After about 30 minutes of processing time, the peroxide treated blend has a melt viscosity of 200,000 cp. at 190° C. The product is permanently tacky and rubbery.

A 15 g. sample of the peroxide treated blend is melt blended in a large test tube with 5 g. of hydrocarbon tackifying resin EASTMAN Resin H-130 tackifier) at 200° C. This blend has a melt viscosity of 100,000 cp. at 190° C. and it is permanently tacky. This blend is readily coated on 1-mil poly(ethylene terephthalate) film and it is useful as a pressure-sensitive adhesive tape.

EXAMPLE 7

Low viscosity amorphous polypropylene (42.75 g.; Eastobond M-5W, melt viscosity 2500 cp. at 190° C.) and ethylene/propylene copolymer [2.25 g. (5 wt. %), Enjay 404 EP rubber, melt flow 0.1 at 230° C.] are dissolved in carbon tetrachloride and then the solvent is removed by distillation. This blend is melted in a Brabender Plastograph at 200° C. A solution of 9 g. (20 wt. %) of Lupersol 101 in 10 ml. of heptane is added to the molten polymers over a 10-minute period and the heptane is allowed to flash off. After about 30 minutes processing time, the peroxide treated blend has a melt viscosity of about 250,000 cp. at 190° C. and it is permanently tacky. Similarly good results are obtained when natural rubber and polyisoprene are used instead of EPR rubber.

EXAMPLE 8

Low viscosity amorphous polypropylene (40.5 g.; Eastobond M-5W, melt viscosity 2500 cp. at 190° C.) and ethylene/propylene copolymer [4.5 g. (10 wt. %) Enjay 404 EP Rubber; melt flow 0.1 at 230° C.] are blended by dissolving the polymers in carbon tetrachloride and then vacuum stripping off the carbon tetrachloride. The blend is melted in a Brabender Plastograph at 200° C. A solution of 4.5 g. (10 wt. %) of Lupersol 101 in 10 ml. of heptane is added to the molten polymer over a 10-minute period and the heptane is allowed to flash off. After about 30 minutes processing time, the peroxide treated blend has a melt viscosity of about 270,000 cp. at 190° C. and it is permanently tacky.

EXAMPLE 9

Low viscosity amorphous polypropylene (33.75 g.; melt viscosity 1700 cp. at 190° C.) and ethylene/propylene copolymer [11.25 g. (25 wt. %); Enjay 404 EP rubber; melt flow 0.1 at 230° C.] are blended according to the procedure described in Example 8. The blend is melted in a Brabender Plastograph at 200° C. A solution of 1.35 g. (3 wt. %) of Lupersol 101 in 10 ml. of heptane is added to the molten polymer over a 10-minute period and the heptane is allowed to flash off. After about 30 minutes processing time, the peroxide treated blend has a melt viscosity of about 225,000 cp. at 190° C.

EXAMPLE 10

Low viscosity amorphous polypropylene (40.5 g.; melt viscosity 1700 cp. at 190° C.) and ethylene/propylene/diene terpolymer [4.5 g. (10 wt. %); Copolymer Rubber Epsyn 5508; melt flow 0.15 at 230° C.] are blended in a manner similar to that described in Example 9. The blend is melted in a Brabender Plastograph at 200° C. A solution of 2.25 g. (5 wt. %) of Lupersol 101 in 10 ml. of heptane is added to the molten polymer over a 10-minute period and the heptane is allowed to flash off. After about 30 minutes processing time, the peroxide treated blend has a melt viscosity of about 265,000 cp. at 190° C. and it is permanently tacky.

The modified amorphous polyolefin/hydrocarbon rubber blends of this invention are useful in pressure-sensitive adhesives. As pressure-sensitive adhesives they find utility in preparing tapes by applying the adhesive by conventional hot melt procedures to a substrate such as a film which can be prepared from conventional film materials such as a polyester, for example. The pressure-sensitive adhesive can also be applied onto labels, decals, floor tile as well as wall coverings, such as wall paper, and shelf coverings, such as shelf paper.

Although the invention has been described in considerable detail with particular reference to certain preferred embodiments thereof, variations and modifications can be effected within the spirit and scope of the invention.

We claim:

1. A process for preparing tacky modified amorphous polyolefin/hydrocarbon rubber compositions useful as pressure sensitive adhesives which comprises reacting a blend comprising at least one hydrocarbon rubber selected from the group consisting of ethylene/propylene copolymer rubber, ethylene/propylene/diene terpolymer or blends of such hydrocarbon rubbers and up to 50 weight percent of at least one substantially amorphous polyolefin selected from the group consisting of substantially amorphous homopolymers of 1-olefins containing 3 to 5 carbon atoms, substantially amorphous copolymers prepared from either ethylene and 1-olefins containing 3 to 5 carbon atoms or propylene and 1-butene, and substantially amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene having a melt viscosity of about 100 to 200,000 cp. at 190° C. with about 2 to 25 weight percent of at least one peroxide selected from the group consisting of ditertiarybutyl peroxide, 2,5-dimethyl-2,5-di(tertiarybutylperoxy)hexane, dicumyl peroxide, and cumene hydroperoxide at a temperature of 150° C. to 250° C. to provide a low viscosity, permanently tacky hot-melt pressure sensitive adhesive.

2. A process according to claim 1 wherein said peroxide is 2,5-dimethyl-2,5-di(tertiarybutylperoxy)hexane.

3. A process according to claim 1 wherein said peroxide is ditertiary butyl peroxide.

4. A process for preparing tacky modified amorphous polyolefin/hydrocarbon rubber compositions useful as pressure sensitive adhesives which comprises reacting a blend comprising at least one hydrocarbon rubber selected from the group consisting of ethylene/propylene copolymer rubber, ethylene/propylene/diene terpolymer or blends of such hydrocarbon rubbers and up to 50 weight percent of at least one substantially amorphous polyolefin selected from the group consisting of substantially amorphous homopolymers of 1-olefins containing 3 to 5 carbon atoms, substantially amorphous copolymers prepared from either ethylene and 1-olefins containing 3 to 5 carbon atoms or propylene and 1-butene, and substantially amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene having a melt viscosity of about 100 to 200,000 cp. at 190° C. with about 3 to 20 weight percent of at least one peroxide selected from the group consisting of ditertiarybutyl peroxide, 2,5-dimethyl-2,5-di(tertiarybutylperoxy)hexane, dicumyl peroxide, and cumene hydroperoxide at a temperature of 150° C. to 250° C. to provide a low viscosity, permanently tacky hot-melt pressure sensitive adhesive.

5. A process according to claim 4 wherein said peroxide is 2,5-dimethyl-2,5-di(tertiarybutylperoxy)hexane.

6. A process according to claim 4 wherein said peroxide is ditertiary butyl peroxide.

7. A process for preparing tacky modified amorphous polyolefin/hydrocarbon rubber compositions useful as pressure sensitive adhesives which comprises reacting a blend comprising at least one hydrocarbon rubber selected from the group consisting of ethylene/propylene copolymer rubber, ethylene/propylene diene terpolymer or blends of such hydrocarbon rubbers and up to 50 weight percent of at least one substantially amorphous polyolefin selected from the group consisting of substantially amorphous homopolymers of 1-olefins containing 3 to 5 carbon atoms, substantially amorphous copolymers prepared from either ethylene and 1-olefins containing 3 to 5 carbon atoms or propylene and 1-butene, and substantially amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene having a melt viscosity of about 100 to 200,000 cp. at 190° C. with about 3 to 20 weight percent of at least one peroxide selected from the group consisting of ditertiarybutyl peroxide, 2,5-dimethyl-2,5-di(tertiarybutylperoxy)hexane, dicumyl peroxide, and cumene hydroperoxide at a temperature of 175° C. to 225° C. to provide a low viscosity, permanently tacky hot-melt pressure sensitive adhesive.

8. A process according to claim 7 wherein said peroxide is 2,5-dimethyl-2,5-di(tertiarybutylperoxy)hexane.

9. A process according to claim 7 wherein said peroxide is ditertiary butyl peroxide.

10. A process for preparing tacky modified amorphous polyolefin/hydrocarbon rubber compositions useful as pressure sensitive adhesives which comprises reacting a blend comprising at least one hydrocarbon rubber selected from the group consisting of ethylene/propylene copolymer rubber, ethylene/propylene/diene terpolymer or blends of such hydrocarbon rubbers and up to 50 weight percent of at least one substantially amorphous polyolefin selected from the group consisting of substantially amorphous homopolymers of 1-olefins containing 3 to 5 carbon atoms, substantially amorphous copolymers prepared from either ethylene and 1-olefins containing 3 to 5 carbon atoms or propylene and 1-butene, and substantially amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene having a melt viscosity of about 100 to 200,000 cp. at 190° C. with about 3 to 20 weight percent of at least one peroxide selected from the group consisting of ditertiarybutyl peroxide, 2,5-dimethyl-2,5-di(tertiarybutylperoxy)hexane, dicumyl peroxide, and cumene hydroperoxide at a temperature of about 200° C. to provide a low viscosity, permanently tacky hot-melt pressure-sensitive adhesive.

11. A process according to claim 10 wherein said peroxide is 2,5-dimethyl-2,5-di(tertiarybutylperoxy)hexane.

12. A process according to claim 10 wherein said peroxide is ditertiary butyl peroxide.

* * * * *